United States Patent
Lu et al.

(10) Patent No.: US 10,977,016 B2
(45) Date of Patent: Apr. 13, 2021

(54) MANAGEMENT OF DATA USING TEMPLATES

(71) Applicant: EMC IP Holding Company LLC, Hopkinton, MA (US)

(72) Inventors: Wenbin Lu, Shanghai (CN); Timothy Bruce, Carrollton, TX (US); Neil Li, Shanghai (CN); Leo Lei Wang, Shanghai (CN); Xiaofeng Luo, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 15/764,861

(22) PCT Filed: Oct. 31, 2017

(86) PCT No.: PCT/CN2017/108626
§ 371 (c)(1),
(2) Date: Mar. 29, 2018

(87) PCT Pub. No.: WO2019/084781
PCT Pub. Date: May 9, 2019

(65) Prior Publication Data
US 2019/0129697 A1    May 2, 2019

(51) Int. Cl.
*G06F 8/41* (2018.01)
(52) U.S. Cl.
CPC ..................... *G06F 8/41* (2013.01)
(58) Field of Classification Search
CPC .......................................................... G06F 8/41
See application file for complete search history.

(56) References Cited

U.S. PATENT DOCUMENTS

| 7,457,631 | B2 | 11/2008 | Yach et al. | |
| 8,136,100 | B1* | 3/2012 | Goldman | G06F 9/45558 717/136 |
| 8,775,485 | B1* | 7/2014 | Cavage | G06F 16/162 707/813 |
| 9,582,328 | B1 | 2/2017 | Tao et al. | |
| 10,089,152 | B1* | 10/2018 | Kramer | G06F 9/445 |
| 10,127,151 | B2* | 11/2018 | Wrighton | G06F 8/41 |
| 2001/0016881 | A1* | 8/2001 | Sanchez, II | G06F 8/41 719/328 |
| 2002/0019972 | A1* | 2/2002 | Grier | G06F 8/71 717/122 |

(Continued)

OTHER PUBLICATIONS

International Search Report and Written Opinion issued in corresponding PCT/CN2017/108626, dated Jun. 21, 2018 (9 pages).

(Continued)

*Primary Examiner* — Ziaul A Chowdhury
(74) *Attorney, Agent, or Firm* — Chamberlain, Hrdlicka, White, Williams & Aughtry

(57) ABSTRACT

A computing device includes a persistent storage and a processor. The persistent storage includes an asset. The processor obtains a computation request for the asset, instantiates an executable entity based on a computation prototype and a manifest associated with the asset, performs the computation request using the instantiated executable entity and metadata specified by the manifest associated with the asset to obtain a computation result; and provides the obtained computation result.

20 Claims, 12 Drawing Sheets

(56) References Cited

U.S. PATENT DOCUMENTS

| | | | |
|---|---|---|---|
| 2005/0044530 A1 | 2/2005 | Novik | |
| 2006/0123412 A1* | 6/2006 | Hunt | G06F 8/61 |
| | | | 717/174 |
| 2006/0277224 A1 | 12/2006 | Aftab et al. | |
| 2007/0260575 A1* | 11/2007 | Robinson | G06F 16/2308 |
| 2009/0083441 A1 | 3/2009 | Clark | |
| 2012/0109988 A1 | 5/2012 | Li et al. | |
| 2013/0047150 A1* | 2/2013 | Malasky | G06F 9/44547 |
| | | | 717/176 |
| 2014/0006459 A1 | 1/2014 | Guo et al. | |
| 2015/0120479 A1 | 4/2015 | Bastien et al. | |
| 2016/0232191 A1 | 8/2016 | Adrian et al. | |
| 2016/0357544 A1* | 12/2016 | Lewallen | G06F 8/61 |
| 2017/0139746 A1 | 5/2017 | Maier et al. | |
| 2017/0308602 A1 | 10/2017 | Raghunathan et al. | |
| 2017/0344227 A1* | 11/2017 | Stoicov | G06F 3/04842 |
| 2018/0253451 A1 | 9/2018 | Callan et al. | |

OTHER PUBLICATIONS

Extended European Search Report issued in corresponding European Application No. 19151906.5, dated Apr. 12, 2019.

\* cited by examiner

MANAGEMENT OF DATA USING TEMPLATES

BACKGROUND

Computing devices may generate new data based on stored data. For example, a computing device may store a database that includes sales data for a variety of products over a period of time. The computing device may generate new data by calculating an average sale price of each sale.

Different types of data may have different formats. Different computing devices may store and/or generate different types of data. Computing devices may share between the devices. Sharing the data between the devices may result in any computing device storing a large number of different types of data in varying formats.

Performing computations on different types of data may require different approaches due to differences in the structures of the different types of data. For example, a database and a table may have different structures that each necessitates the use of different ways of indexing to perform the same computation on each data structure.

SUMMARY

In one aspect, a computing device in accordance with one or more embodiments of the invention includes a persistent storage and a processor. The persistent storage includes an asset. The processor obtains a computation request for the asset, instantiates an executable entity based on a computation prototype and a manifest associated with the asset, performs the computation request using the instantiated executable entity and metadata specified by the manifest associated with the asset to obtain a computation result; and provides the obtained computation result.

In one aspect, a method of operating a computing device in accordance with one or more embodiments of the invention includes obtaining a computation request for an asset; instantiating an executable entity based on a computation prototype and a manifest associated with the asset; performing, to obtain a computation result, the computation request using the instantiated executable entity and metadata specified by the manifest associated with the asset; and providing the obtained computation result.

In one aspect, a non-transitory computer readable medium in accordance with one or more embodiments of the invention includes computer readable program code, which when executed by a computer processor enables the computer processor to perform a method for operating a computing device, the method includes obtaining a computation request for an asset; instantiating an executable entity based on a computation prototype and a manifest associated with the asset; performing, to obtain a computation result, the computation request using the instantiated executable entity and metadata specified by the manifest associated with the asset; and providing the obtained computation result.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing computations on varying types of assets. As used herein, an asset refers to any type of data in any format. A system or device may include multiple assets of varying types and formats.

In one more embodiments of the invention, computations are performed on assets using dynamically generated executable entities. When a computation is to be performed, an executable entity may be generated based on a template. The template may be associated with a type of the to-be-performed computation. The template may include a prototype computation that is not independently executable until combined with a manifest associated with the asset. The prototype code may be combined with the asset by modifying the prototype code based on the manifest.

As used herein, a manifest refers to a data structure associated with an asset and generated based on a template associated with a type of the asset. The manifest may include metadata associated with the asset. The metadata of the manifest may be combined with the prototype code by replacing a placeholders within the prototype code with corresponding portions of the metadata.

Figure 1A:
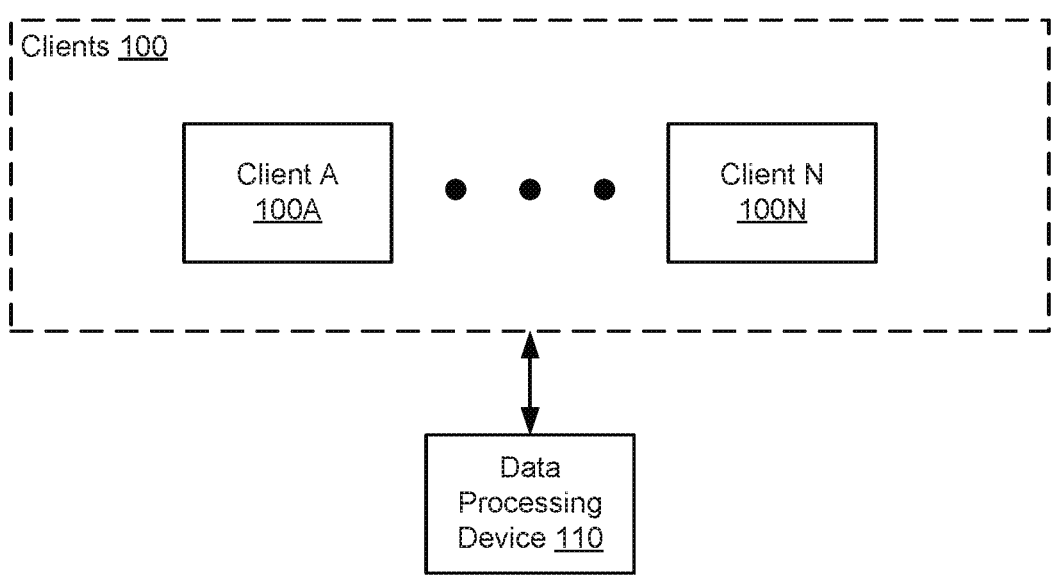
FIG. 1A shows a diagram of a system in accordance with one or more embodiments of the invention.

FIG. 1A shows a system in accordance with one or more embodiments of the invention. The system may include clients (100) that request computations be performed by a data processing device (110) on assets. The clients (100) and the data processing device (110) may be operably connected. The operable connections may be implemented using any communication method or combination without departing from the invention. Each component of the system is discussed below.

The clients (100) may be computing devices. The computing devices may be, for example, mobile phones, tablet computers, laptop computers, desktop computers, servers, computing clusters, or cloud computing systems. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention.

The clients (100) may send computation requests to the data processing device (110). A computation request may request that a computation be formed on one or more assets.

In one or more embodiments of the invention, the clients (100) may have access to a map (not shown) that specifies the assets on which computations may be performed by the data processing device (110). In one or more embodiments of the invention, the map may be a data structure that specifies the aforementioned information. The map may be stored on a non-transitory computer readable storage medium of any of the clients (100) or another computing device operably connected to the clients (100). In one or more embodiments of the invention, the computation that may be performed on the assets may be specified by a template associated with the assets. For example, a template may specify the types of computations that may be performed on an asset. The map may include a listing of the aforementioned types of computations for each asset. Templates and assets are discussed in greater detail below.

In one or more embodiments of the invention, the clients (100) may utilize the map to generate computation requests. For example, the clients (100) may select a type of computation to be performed on an asset specified by the map.

The data processing device (110) may service computation requested by clients (100). More specifically, the data processing device (110) may perform computations on assets and provide the computation result.

In one or more embodiments of the invention the data processing device (110) may be a logical computing device including computing resources derived from physical computing devices. The derived computing resources may enable the data processing device (110) to perform computations, store data in memory and/or a persistent storage, and/or communicate with other devices. The logical computing device may be, for example, a cloud computing system, a computer cluster, or a computer network.

The physical computing devices may be, for example, mobile phones, tablet computers, laptop computers, desktop computers, or servers. The physical computing devices may include one or more processors, memory (e.g., random access memory), and persistent storage (e.g., disk drives, solid state drives, etc.). The persistent storage may store computer instructions, e.g., computer code, that when executed by the processor(s) of the physical computing device cause the physical computing device to perform the functions described in this application and/or the methods illustrated in FIGS. 3-4C.

The computing resources of the data processing device (110) may be derived from other types of computing devices or virtual computing devices without departing from the invention. For example, a computing resource may be derived from a virtual machine executing on a computing device.

Figure 1B:
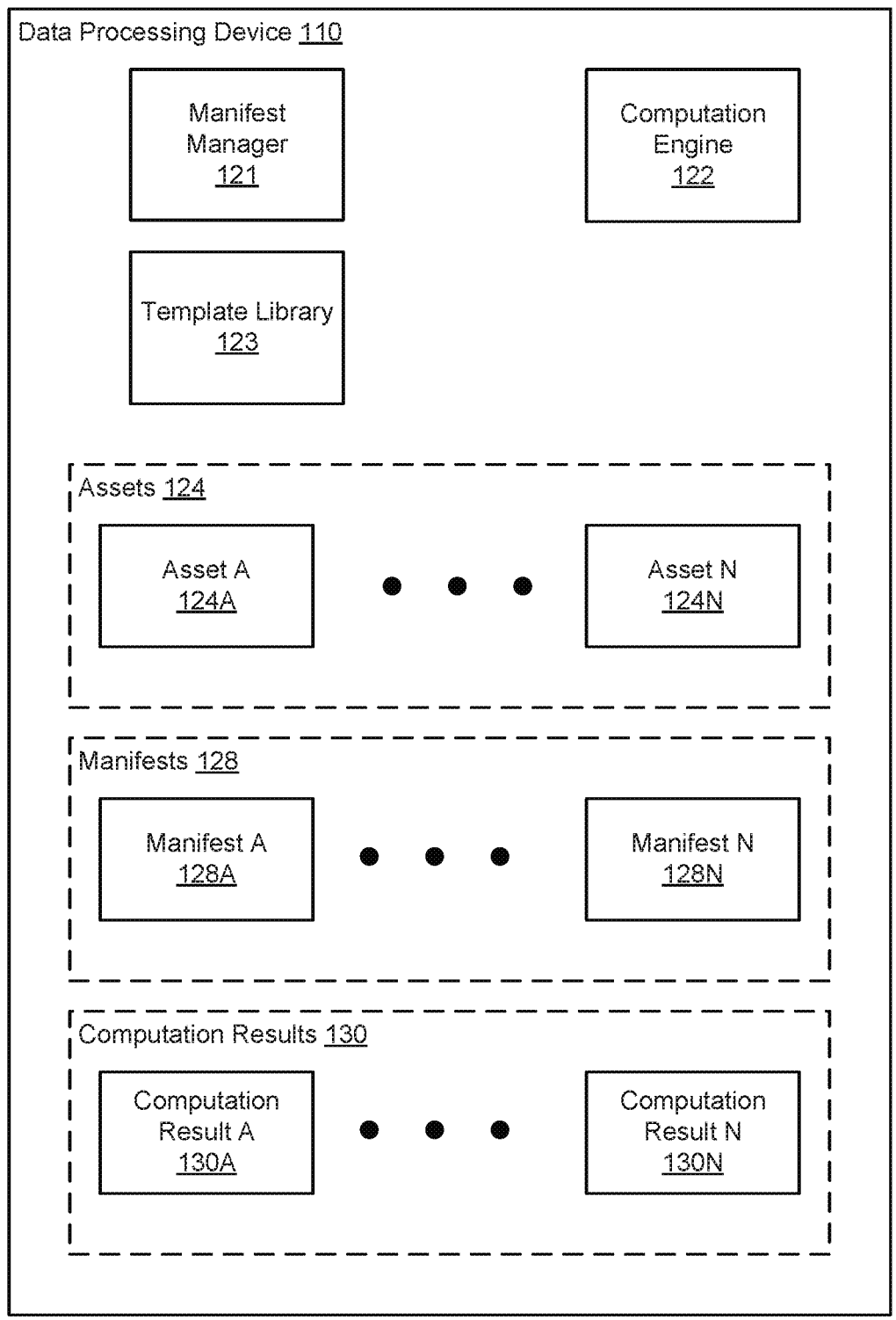
FIG. 1B shows a diagram of a data processing device in accordance with one or more embodiments of the invention.

To further clarify the data processing device (110), FIG. 1B shows a diagram of the data processing device (110) in accordance with one or more embodiments of the invention. As noted above, the data processing device (110) may service computation requests from clients. To service the computation requests, the data processing device may include a manifest manager (121) that manages manifests (128) associated with assets (124), a template library (123) that may be used by the manifest manager (121) to generate the manifests (128), and a computation engine (122) that generates computation results (130) using the manifests (128), the assets (124), and/or templates stored in the template library (123). Each component of the data processing device (110) is discussed below.

In one or more embodiments of the invention, the manifest manager (121) manages manifests (128). More specifically, the manifest manager (121) may generate manifests (128) corresponding to assets (124) using templates from the template library (123). As assets (124) are modified, the manifest manager (121) may take action to maintain the consistency of the associated manifests (128). In one or more embodiments of the invention, each manifest is generated using metadata associated with the corresponding asset.

Figure 3:
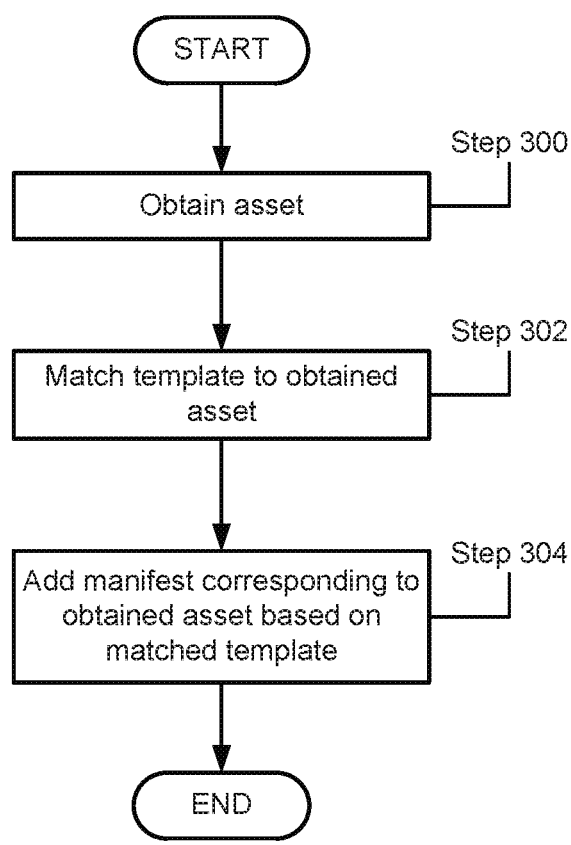
FIG. 3 shows a flowchart of a method of adding a manifest in accordance with one or more embodiments of the invention.

In one or more embodiments of the invention, the manifest manager (121) generates manifests (128) via the method illustrated in FIG. 3. The manifest manager (121) may generate the manifests (128) using other methods without departing from the invention. Other components of the data processing device (110) may perform the method illustrated in FIG. 3 without departing from the invention.

In one or more embodiments of the invention, the manifest manager (121) is implemented as one or more processes executing using computing resources of the data processing device (110). The processes may execute in accordance with computer instructions stored on a non-transitory computer readable media. The computing instructions, when executed using processing computing resources of the data processing device (110) cause computing device(s) of the data processing device (110) to perform the functions of the manifest manager (121) and/or all or a portion of the methods illustrated in FIG. 3.

In one or more embodiments of the invention, the manifest manager (121) may be implemented as a hardware device such as, for example, a programmable gate array, an application specific integrated circuit, or another electronic device including circuitry that provide the aforementioned functionality of the manifest manager (121).

In one or more embodiments of the invention, the computation engine (122) performs computations to service computation requests from the clients (100, FIG. 1A). More specifically, the computation engine (122) may dynamically generate executable code to service the computation requests from clients based on computation prototypes specified by templates of the template library. For additional details regarding computation prototypes, See FIG. 2B.

Figure 4A:
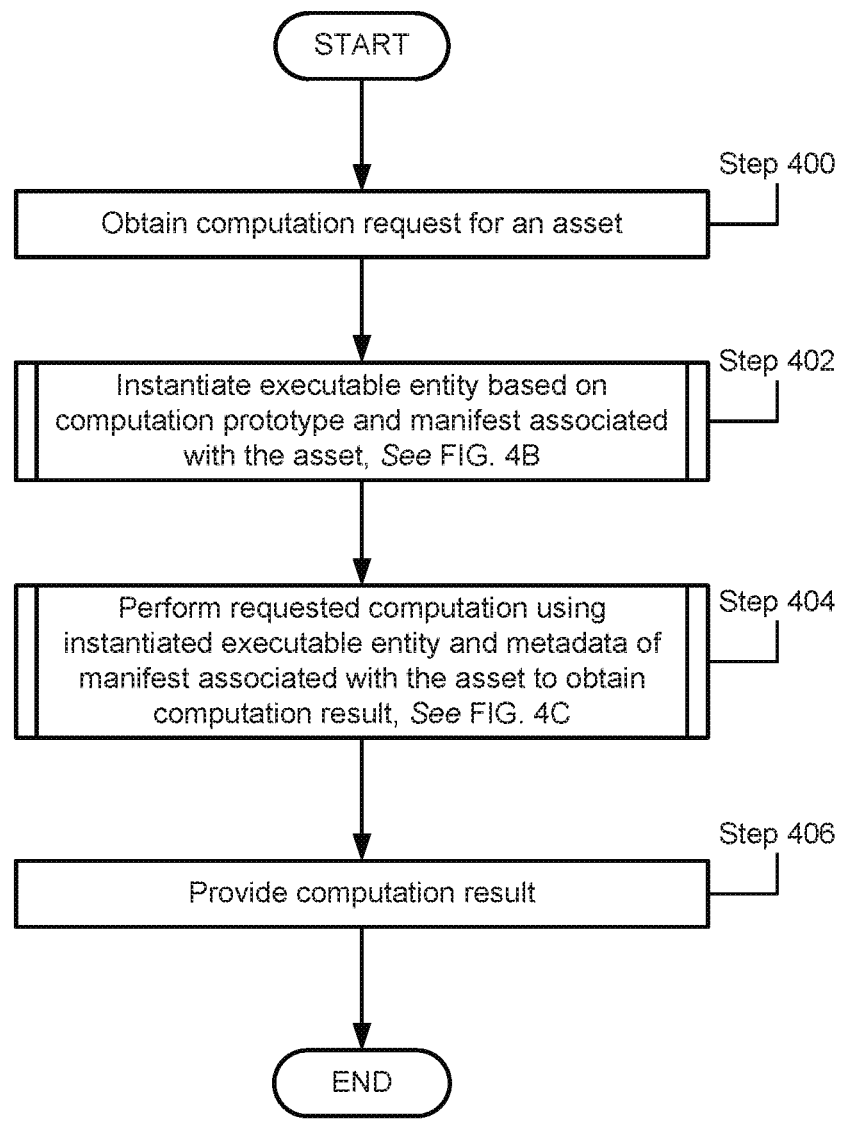
FIG. 4A shows a flowchart of a method of operating a data processing device in accordance with one or more embodiments of the invention.
Figure 4B:
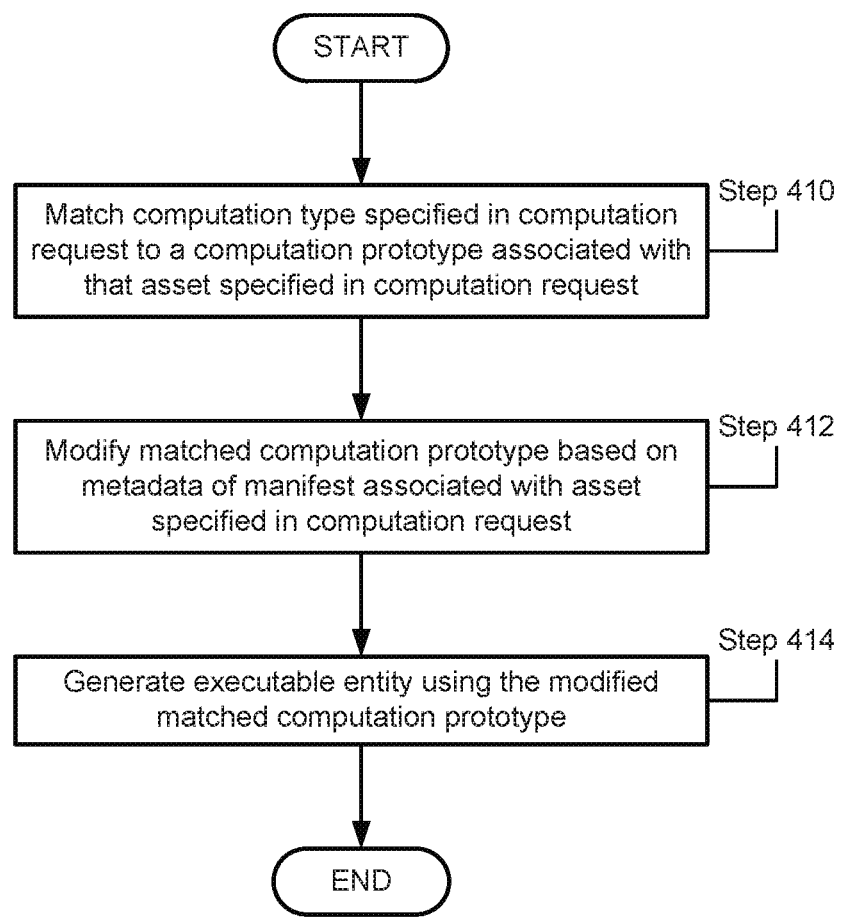
FIG. 4B shows a flowchart of a method of generating an executable entity in accordance with one or more embodiments of the invention.
Figure 4C:
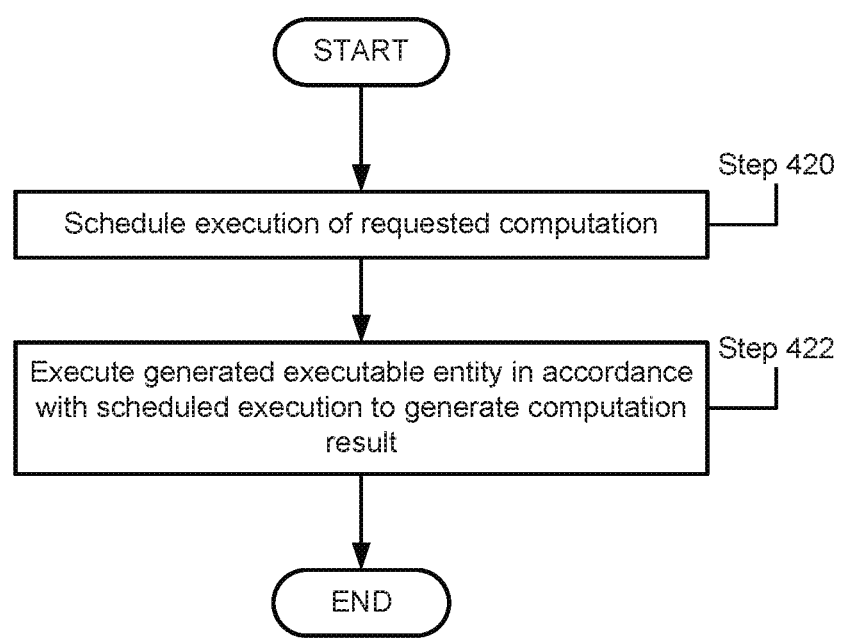
FIG. 4C shows a flowchart of a method of generating a computation result in accordance with one or more embodiments of the invention.

In one or more embodiments of the invention, the computation engine (122) performs computations to service computation requests from the clients via the method illustrated in FIGS. 4A-4C. The computation engine (122) may perform computations to service computation requests from the clients using other methods without departing from the invention. Other components of the data processing device (110) may perform the method illustrated in FIGS. 4A-4C without departing from the invention.

In one or more embodiments of the invention, the computation engine (122) is implemented as one or more processes executing using computing resources of the data processing device (110). The processes may execute in accordance with computer instructions stored on a non-transitory computer readable media. The computing instructions, when executed using processing computing resources of the data processing device (110) cause computing device(s) of the data processing device (110) to perform the functions of the computation engine (122) and/or all or a portion of the methods illustrated in FIG. 4A-4C.

In one or more embodiments of the invention, the manifest manager (121) may be implemented as a hardware device such as, for example, a programmable gate array, an application specific integrated circuit, or another electronic device including circuitry that provide the aforementioned functionality of the manifest manager (121).

In one or more embodiments of the invention, the template library (123) includes a number of templates. The templates may be used to (i) generate manifests (128) for assets (124) and (ii) generate executable code to service client computation requests. For additional details regarding the templates. See FIGS. 2A-2B.

In one or more embodiments of the invention, the template library (123) may be updated to include new templates or may be updated to modify an existing template. For example, a new template may be added to the library to enable a new type of data structure to be handled. Thus, the template library (123) may enable new data structures to be handled by the data processing device (110). In a second example, an existing template may be modified to handle a new type of operation on a data structure. The existing template may be modified so that additional information is added to a corresponding manifest and/or a new prototype computation is added/an existing prototype computation is modified to enable a new type of computation to be performed on an asset.

In one or more embodiments of the invention, the template library (123) is implemented as a data structure stored on a non-transitory storage. While illustrated in FIG. 1B as being stored in the data processing device (110), the template library (123) may be stored elsewhere without departing from the invention. For the example, the template library (123) may be stored on a non-transitory storage of another computer device operably connected to the data processing device (110).

In one or more embodiments of the invention, the assets (124) may be data of any type, include any type of content, and be in any format. Different assets (124) may be of different types, include different content, and/or be in different formats. The assets (124) may be, for example, text files, databases, tables, audio files, video files, or any other type of file.

In one or more embodiments of the invention, the assets (124) are implemented as a data structures stored on a non-transitory storage. While illustrated in FIG. 1B as being stored in the data processing device (110), the assets (124) may be stored elsewhere without departing from the invention. For the example, the assets (124) may be stored on a non-transitory storage of another computer device operably connected to the data processing device (110). In another example, a first asset (124A) may be stored in a first computing device that is operably connected to the data processing device (110) and a second asset (124N) may be stored in a second computing device that is operably connected to the data processing device (110).

In one or more embodiments of the invention, the manifests (128) are instances of data structures specified by the template of the template library (123). Each manifest may be associated with an asset and include data specified by a template of the template library (123). For example, a template may specify a subset of the metadata associated with an asset and a manifest corresponding to the asset may include the subset of the metadata. As will be discussed in greater detail with respect to FIGS. 2A-2B, the manifests may include data used to generate executable code to service computation requests from clients.

In one or more embodiments of the invention, the manifests (128) are stored on a non-transitory storage. While illustrated in FIG. 1B as being stored in the data processing device (110), the manifests (128) may be stored elsewhere without departing from the invention. For the example, the assets (124) may be stored on a non-transitory storage of another computer device operably connected to the data processing device (110). In another example, a first manifest (128A) may be stored in a first computing device that is operably connected to the data processing device (110) and a second manifest (128N) may be stored in a second computing device that is operably connected to the data processing device (110).

In one or more embodiments of the invention, the computation results (130) are results of computations performed by the computation engine (122) to service client requests. Each computation result may include data in any format and of any time.

In one or more embodiments of the invention, the computation results (130) are stored on a non-transitory storage. While illustrated in FIG. 1B as being stored in the data processing device (110), the computation results (130) may be stored elsewhere without departing from the invention. For the example, the computation results (130) may be stored on a non-transitory storage of another computer device operably connected to the data processing device (110). In another example, a computation result (130A) may be stored in a first computing device that is operably connected to the data processing device (110) and a second computation result (130N) may be stored in a second computing device that is operably connected to the data processing device (110).

As discussed above, the manifest manager (121) may generate manifests (128) used by the computation engine (122) to generate computation results (130). To further clarify the process of generating computation results, FIGS.

Figure 2A:
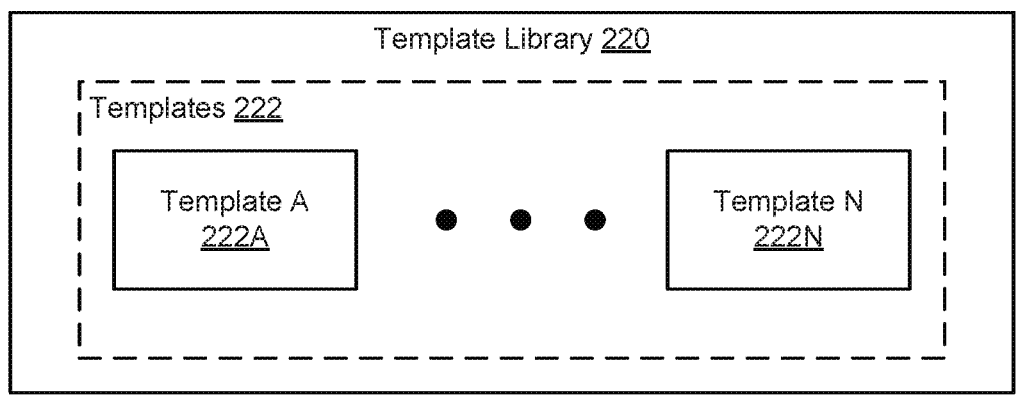
FIG. 2A shows a diagram of an example template library in accordance with one or more embodiments of the invention.
Figure 2B:
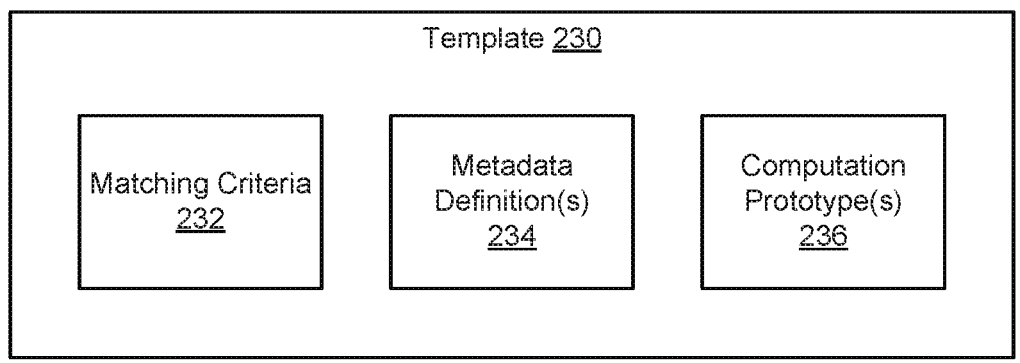
FIG. 2B shows a diagram of an example template in accordance with one or more embodiments of the invention.
Figure 2C:
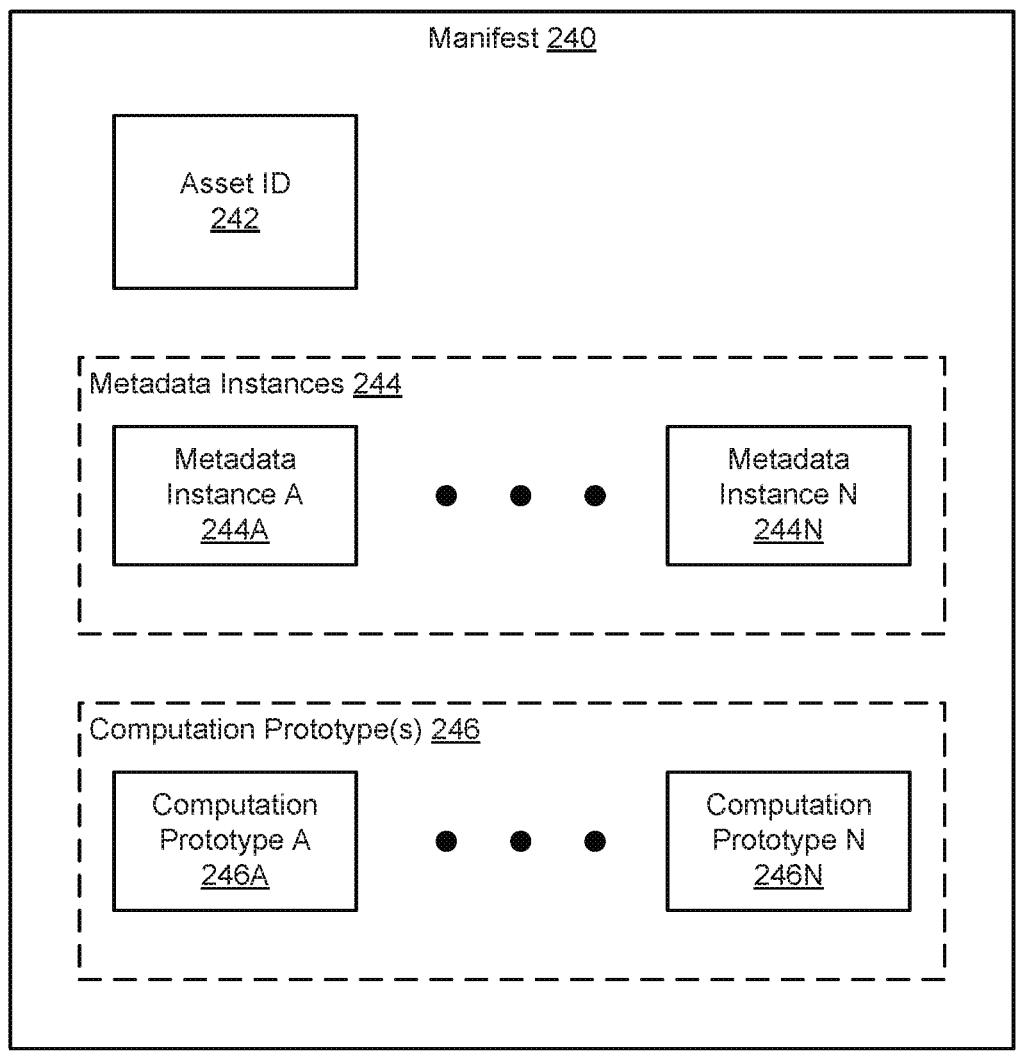
FIG. 2C shows a diagram of a first example manifest in accordance with one or more embodiments of the invention.
Figure 2D:
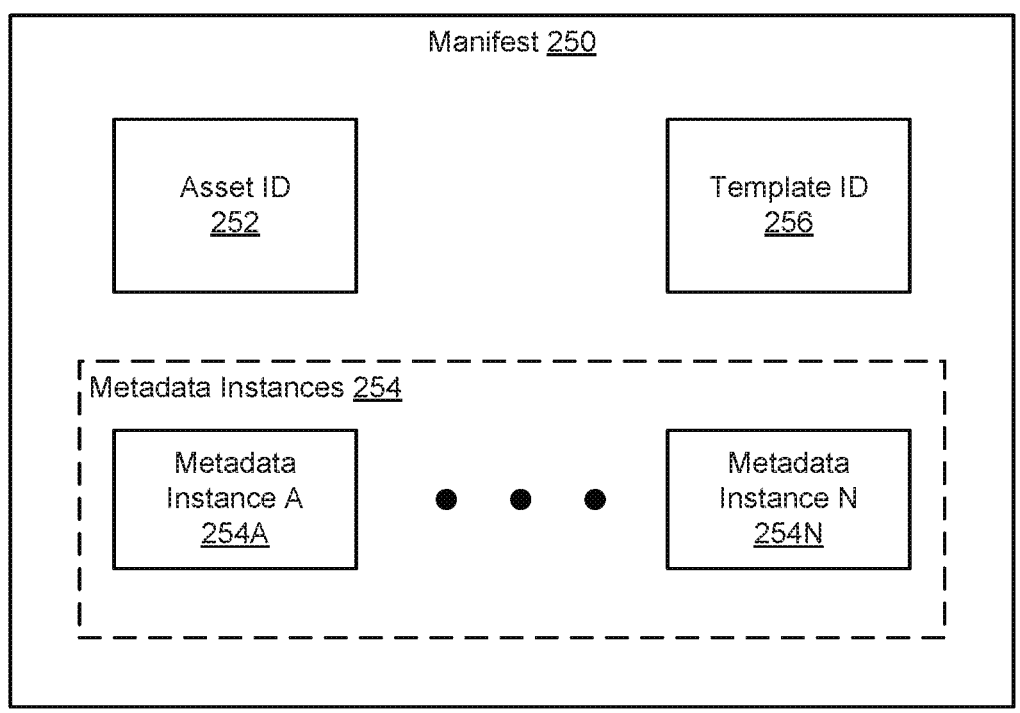
FIG. 2D shows a diagram of a second example manifest in accordance with one or more embodiments of the invention.

2A-2B show diagrams of the template library (220) and an example template (230), respectively, and FIGS. 2C-2D show examples of manifests.

Returning to FIG. 2A, the figure shows a diagram of a template library (220) in accordance with one or more embodiments of the invention. The template library (220) may include a number of templates (222A. 222N). Each of the templates may be associated with different types of assets. A template associated with an asset may be used to generate a manifest associated with the asset and may be used to generate executable code to perform a computation that implicates the asset. As used herein, an asset is implicated if a computation is to be performed on the asset.

FIG. 2B shows a diagram of an example template (230) in accordance with one or more embodiments of the invention. The template (230) includes a matching criteria (232), metadata definition(s) (234), and computation prototype(s) (236). Each component of the template (230) is discussed below.

The matching criteria (232) may associate the template (230) with a type of asset. The type of the asset may be, for example, a type of data included in the asset or a format of the data included in the asset, or another. Other matching criteria may be used without departing from the invention.

The matching criteria (232) may associate the template (230) with any number of assets (230). For example, the matching criteria (232) may specify a data format of a table and two different assets may be formatted as tables. Thus, the matching criteria (232) may associate the template with the two different assets because both assets meet the matching criteria. Other types of matching criteria may be used without departing from the invention.

In one or more embodiments of the invention, the matching criteria may be a tuple that specifies a category, a class, and a type. An asset may need to meet all three criteria to be considered to match the matching criteria. The category may specify a kind of asset that meets the matching criteria. The kind may be, for example, data or application. The class may specify a type of asset that meets the matching criteria. The type may be, for example, posix, hdfs, mysql, or hive. Other types may be used without departing from the invention. The type may specify a format of assets meet the matching criteria. The format may be, for example, a table, a file, or a comma separate value file. Other formats may be used without departing from the invention.

In contrast to the matching criteria, the metadata definition(s) (234) may specify types of data that are included in a manifest. The metadata definition(s) (234) may specify that any number, quantity, and/or type of data that is to be included in a manifest. When the manifest manager instantiates a manifest, the manifest manager populates the manifest with data based on the metadata definition(s) (234). Thus, whenever a manifest is instantiated, the manifest includes the same types of data as other manifests instantiated using the same template.

In one or more embodiments of the invention, the metadata definition(s) (234) include definitions that cause metadata associated with the asset to be included in a manifest. The metadata may be, for example, a file name, a file location, a type of the asset, a class of the asset, or a category of the asset. The file location may be, for example, a uniform resource locator. Other types of metadata may be specified for inclusion in manifests by the definition(s) (234) without departing from the invention.

In one or more embodiments of the invention, the computation prototype(s) (236) may be data structures that enable an executable entity to be generated that performs a type of computation or other action specified by the computation prototype(s) (236). The computation or other action may be, for example, publication of an asset, deployment of an asset, or deletion of an asset. The computation or other action may be other types of computations and/or action without departing from the invention.

As used herein, publication of an asset means to expose an asset. An asset may be exposed by making a copy of the asset and storing the copy in a location accessible by multiple clients. As used herein, deployment of an asset means to make a private copy of an asset. An asset may be deployed by making a copy of the asset and storing the copy in a private location. As used herein, deletion of an asset means to remove all or a portion of the asset from storage.

In one or more embodiments of the invention, the computation prototype(s) (236) include placeholders, or other references, to the metadata definition(s) (234). The placeholders may be replaced with corresponding data from a manifest when generating an executable entity. Not all computation prototype(s) (236) may include placeholders.

In one or more embodiments of the invention, the computation prototype(s) (236) are action scripts that include references to metadata definition(s) (234). The actions scripts may be, for example, shell scripts, python scripts, or powershell scripts. Other types of actions scripts maybe used without departing from the invention.

In one or more embodiments of the invention, the computation prototype(s) (236) are references to compiled code. In other words, the computation prototype(s) (236) may reference instances of existing compiled code and/or instantiate new instances of the compiled code using the reference included in the computation prototype(s) (236). The compiled code may be, for example, an application. The compiled code may be generated using a compiler that compiles instructions written in a formal language to obtain the compiled code. The compiled code may include any quantity of object code generated by the compiler. The object code may be linked to generate an executable file. Other types of compiled code maybe used without departing from the invention.

The computation prototype(s) (236) may include any number of prototype computations for performing any type of computation/action. For example, the computation prototype(s) (236) may include computation prototypes for extracting a portion of an asset, generating an average value of an asset, or comparing the asset to another asset.

As discussed above, the templates of the template library may be used to generate the manifests. FIGS. 2C and 2D show examples of manifests in accordance with embodiments of the invention. The examples illustrate different types of data structures that may be used to implement the manifests while providing similar functionality.

FIG. 2C shows a first example of a manifest (230) in accordance with one or more embodiments of the invention. The manifest (230) may be used by the computation engine to generate executable entities to service computation requests from clients.

The first example manifest (240) may include an asset identifier (242) that associates the manifest (240) with an asset. The asset identifier (242) may be a file name, a uniform resource locator, or any other type of identifier of an asset.

The first example manifest (240) may also include metadata instances (244). The metadata instances are instances of the data specified by the metadata definition(s) of a template used to generate the manifest (240). The manifest (240) may include any quantity of metadata instances (244A, 244N) without departing from the invention.

The first example manifest (240) may further include computation prototype(s) (246). The computation prototype(s) (246) may be the same as those included in the template used to generate the manifest (240). Thus, when generating executable entities, the computation prototype(s) (246) may be retrieve from a manifest in some embodiments of the invention.

FIG. 2D shows a second example of a manifest (250) in accordance with one or more embodiments of the invention. The second example manifest (250) may be used by the computation engine to generate executable entities to service computation requests from clients.

The second example manifest (250) may include an asset identifier (252) that associates the second example manifest (250) with an asset. The asset identifier (252) may be a file name, a uniform resource locator, or any other type of identifier of an asset.

The second example manifest (250) may also include metadata instances (254). The metadata instances are instances of the data specified by the metadata definition(s) of a template used to generate the second example manifest (250). The second example manifest (250) may include any quantity of metadata instances (254A, 254N) without departing from the invention.

The second example manifest (250) may further include a template identifier (256). The template identifier (256) may be used to identify a template used to generate the manifest (250). Thus, when generating executable entities, the computation prototype(s) may be retrieve from a template used to generate second example manifest (250) in some embodiments of the invention.

While FIGS. 2C-2D show example of manifests, embodiments of the invention are not so limited. The manifests may have other data structures, include less or more information, and/or include different information without departing from the invention.

As discussed above, the data processing device (110, FIG. 1A) may perform computations in response to requests from the clients (100, FIG. 1A). FIGS. 3-4C show methods in accordance with one or more embodiments of the invention that may be performed by the data processing device (110, FIG. 1A).

While illustrated as separate methods, each of the methods illustrated in FIGS. 3-4C may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

FIG. 3 shows a flowchart of a method in accordance with one or more embodiments of the invention. The method depicted in FIG. 3 may be used to manage manifests in accordance with one or more embodiments of the invention. The method shown in FIG. 3 may be performed by, for example, a manifest manager (121, FIG. 1B). Other component of the data processing device (110) illustrated in FIG. 1B may perform the method of FIG. 3 without departing from the invention.

In Step 300, an asset is obtained.

In one or more embodiments of the invention, the asset is obtained by storing the asset on a persistent storage. The persistent storage may be part of the data processing device. The persistent storage may be part of a different computing device.

In Step 302, a template is matched to the obtained asset.

In one or more embodiments of the invention, the template is a template of a template library as shown in FIGS. 2A-2B. The template may be matched by comparing a type of the asset to a type specified by the templates of the template library. The template of the template library having an asset type identifier that matches the asset type of the asset may be considered to be the match.

In Step 304, a manifest corresponding to the obtained asset is added based on the matched template.

In one or more embodiments of the invention, the manifest may be added by instantiating a manifest. The manifest may be instantiated by generating a new data structure that includes data corresponding to the metadata definitions of the matched template. As described with respect to FIG. 2B, a template may include any number of metadata definitions. When the new data structure is generated, it may be populated with data specified by the metadata definitions. In one or more embodiments of the invention, the data specified by the metadata definitions is metadata associated with the obtained asset.

In one or more embodiments of the invention, the added manifest may be stored on a non-transitory storage after being added. In one or more embodiments of the invention, the manifest may be added by obtaining the manifest from another computing device. For example, the data processing device may be operably connected to other computing devices. The manifest may be stored on the other computing devices. The manifest may be added by copying the manifest from the other computing device to the data processing device or a persistent storage accessible by the data processing device.

The method may end following Step 304.

FIG. 4A shows a flowchart of a method in accordance with one or more embodiments of the invention. The method depicted in FIG. 4A may be used to perform a computation in accordance with one or more embodiments of the invention. The method shown in FIG. 4A may be performed by, for example, a computation engine (122, FIG. 1B). Other components of the data processing device (110) illustrated in FIG. 1B may perform the method of FIG. 4A without departing from the invention.

In Step 400, a computation request for an asset is obtained.

In one or more embodiments of the invention, the computation request is obtained from a client. In one or more embodiments of the invention, the computation request may specify an asset on which a computation is to be performed and a description of the computation to be performed. In one or more embodiments of the invention, the description of the computation is a computation type.

In Step 402, an executable entity is instantiated based on a computation prototype and a manifest.

In one or more embodiments of the invention, the computation prototype is obtained from a template that was used to generate the manifest. In one or more embodiments of the invention, the computation prototype matches a description of the computation specified by the obtained computation request.

In one or more embodiments of the invention, the executable entity is instantiated based on a computation prototype and a manifest via the method illustrated in FIG. 4B. The executable entity may be instantiated using other methods without departing from the invention.

In Step 404, the requested computation is performed using the instantiated executable entity and metadata of the manifest associated with the asset to obtain the computation result.

In one or more embodiments of the invention, the requested computation is performed via the method illustrated in FIG. 4C. The requested computation may be performed using other methods without departing from the invention.

In Step 406, the computation result is provided.

In one or more embodiments of the invention, the computation result is provided by sending the computation result to the requesting entity.

In one or more embodiments of the invention, the computation result is provided by storing the result in a persistent storage.

In one or more embodiments of the invention, the computation result may be used to update the manifest associated with the asset. For example, the computation result may change a portion of the asset and the metadata corresponding to the data. In such a scenario, the computation result may also be used to update the manifest corresponding to the asset. In one or more embodiments of the invention, the manifest associated with the asset is updated in response to the generation of the computation result.

The method may end following Step 406.

FIG. 4B shows a flowchart of a method in accordance with one or more embodiments of the invention. The method depicted in FIG. 4B may be used to instantiate an executable entity in accordance with one or more embodiments of the invention. The method shown in FIG. 4B may be performed by, for example, a computation engine (122, FIG. 1B). Other components of the data processing device (110) illustrated in FIG. 1B may perform the method of FIG. 4B without departing from the invention.

In Step 410, a computation type specified in the obtained computation request is matched to a computation prototype associated with the asset specified in the obtained computation request.

In one or embodiments of the invention, the asset may be match a template. The template may include multiple prototypes. Each computation prototype may be associated with different type of computations. The computation prototype associated with the type of computation specified by the computation request may be considered to be the matched.

In Step 412, a copy of the matched computation prototype is modified based on metadata of a manifest associated with the asset specified in the computation request.

In one or more embodiments of the invention, the matched computation prototype may include placeholders for metadata. The copy of the matched computation prototype may be modified by inserting them metadata from the manifest associated with the asset specified in the computation request.

In Step 414, an executable entity is generated using the modified matched computation prototype.

In one or more embodiments of the invention, the executable entity may be generated by compiling the modified matched computation prototype. The result of the compilation may be machine code that operates on the asset specified in the computation request. The machine code may include functions or operations based on the metadata added to the modified matched computation prototype from the manifest.

The method may end following Step 414.

FIG. 4C shows a flowchart of a method in accordance with one or more embodiments of the invention. The method depicted in FIG. 4C may be used to perform a client requested computation in accordance with one or more embodiments of the invention. The method shown in FIG. 4C may be performed by, for example, a computation engine (122, FIG. 1B). Other components of the data processing device (110) illustrated in FIG. 1B may perform the method of FIG. 4C without departing from the invention.

In Step 420, execution of the requested computation is scheduled.

In one or embodiments of the invention, the requested computation may be scheduled for execution by negotiating with a scheduler that manager computing resources of the data computation device.

In Step 422, the generated executable entity is executed in accordance with the scheduled execution to generate the computation result.

In one or more embodiments of the invention, the executable entity is executed during a time window using computing resources specified by the schedule.

The method may end following Step 422.

Figure 5A:
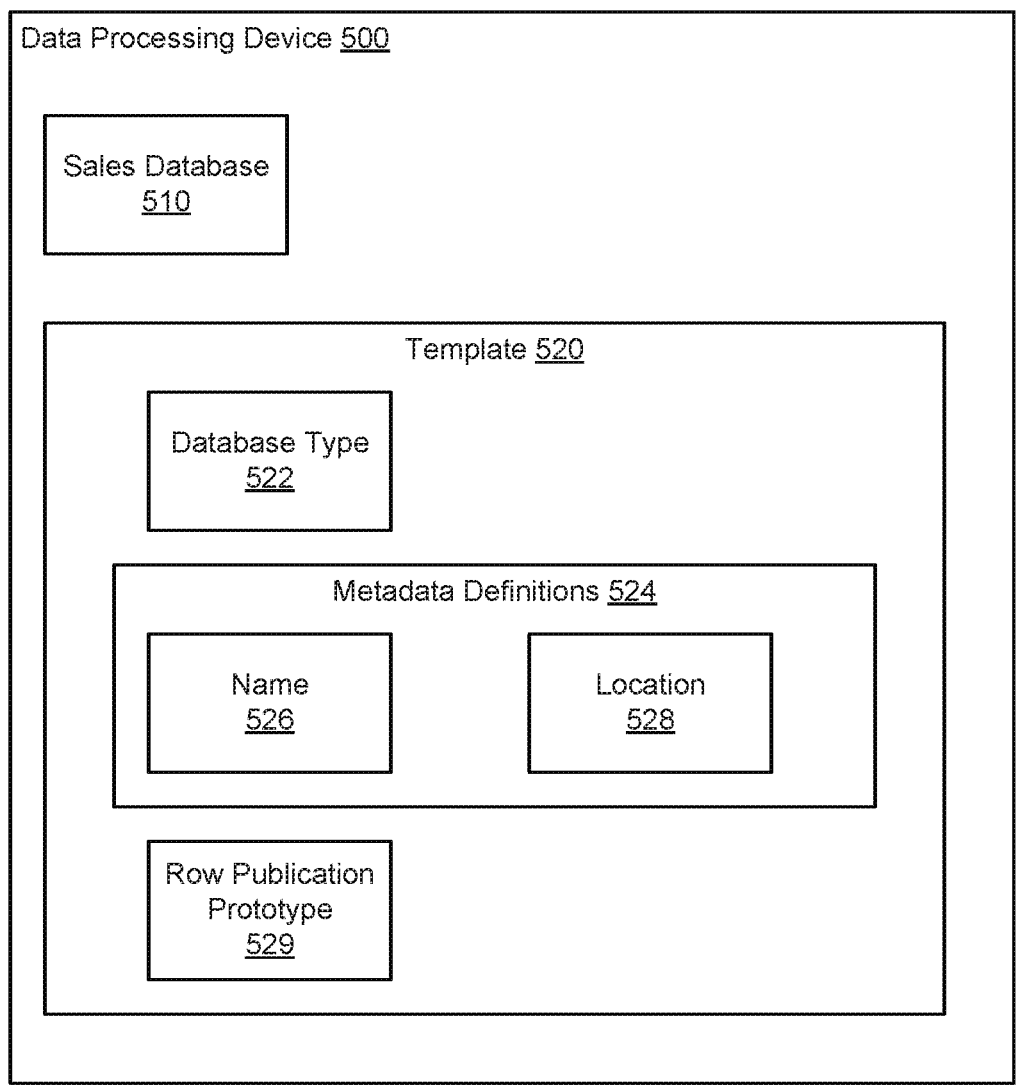
FIG. 5A shows a diagram of an example system at a first point in time.
Figure 5B:
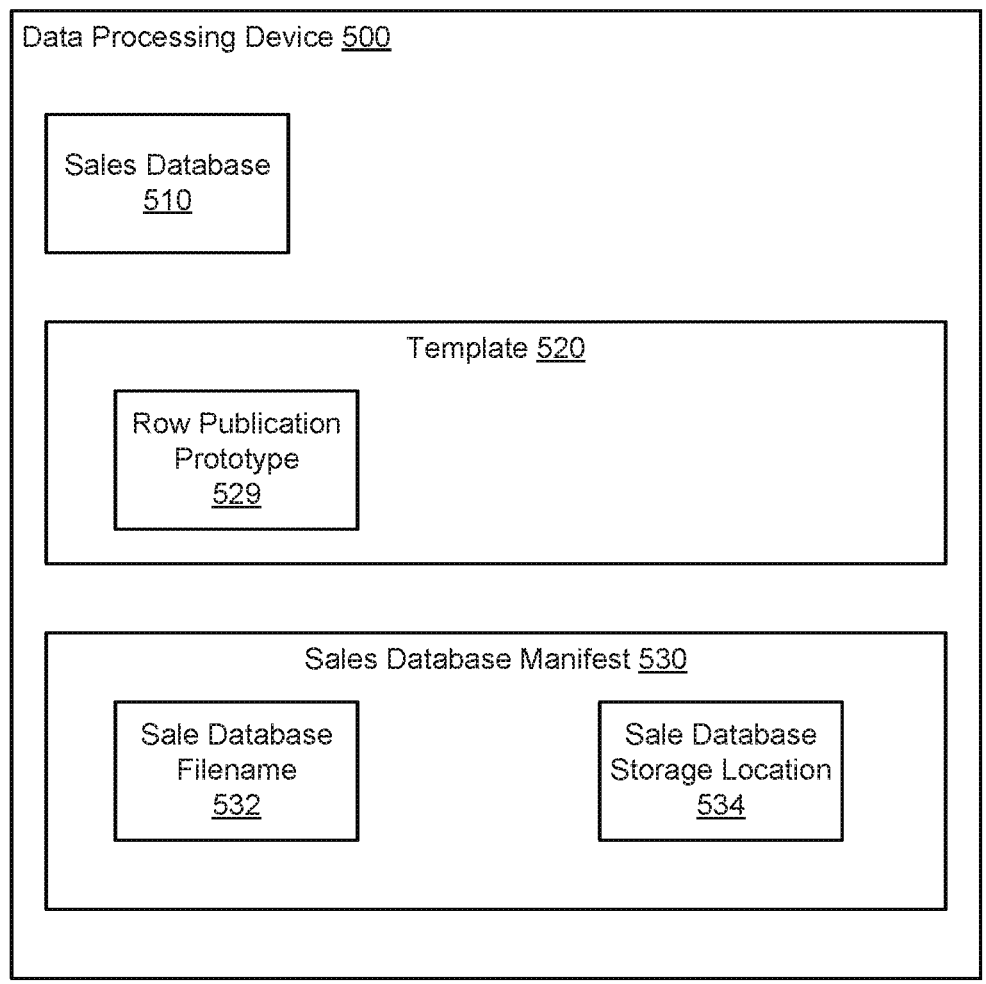
FIG. 5B shows a diagram of the example system of FIG. 5A at a second point in time.
Figure 5C:
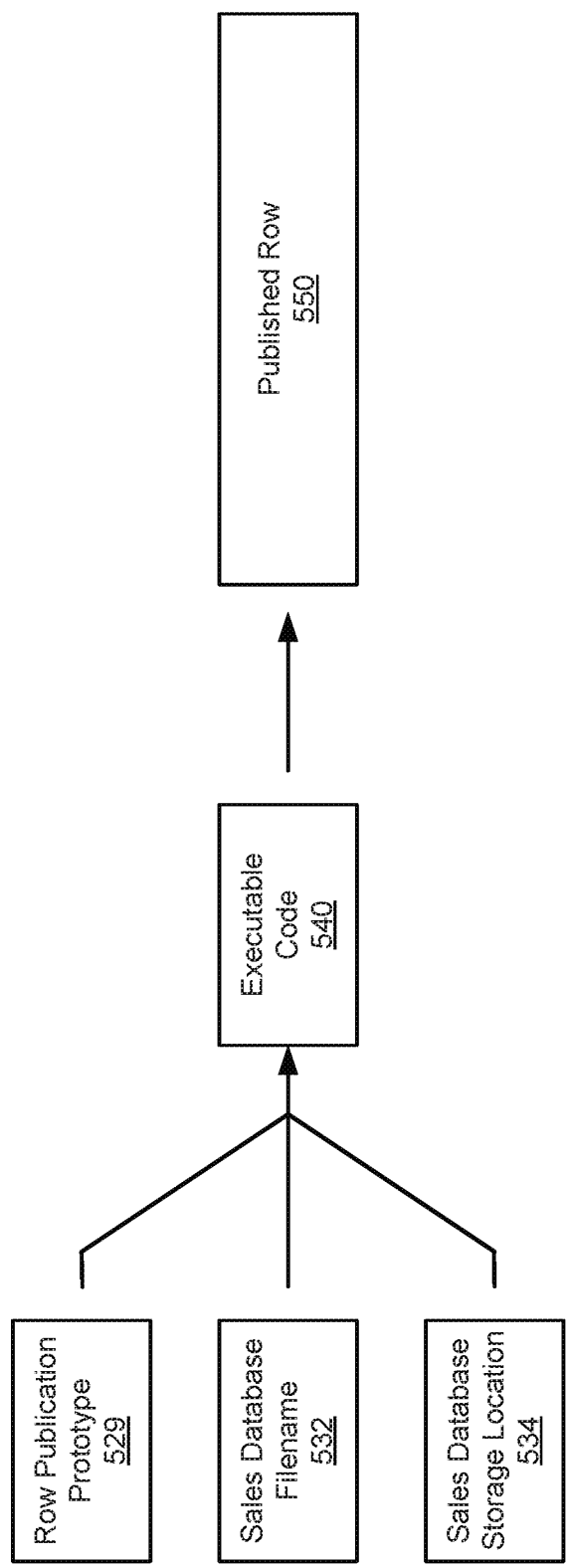
FIG. 5C shows a diagram of a computation performed by the example system of FIG. 5A.

To further clarify aspects of the invention, a non-limiting example is shown in FIGS. 5A-5C. FIG. 5A shows a diagram of a data processing device (500) at a first point in time. Not all components of the data processing device (500) are shown in FIG. 5A for brevity.

Example

Consider a system, as illustrated in FIG. 5A, in which a data processing device (500) is operably connected to clients. The data processing device (500) includes an asset of a sales database (510) and a template (520). The template (520) has a matching criteria that matches to all database types (522). The template (520) also includes metadata definitions (524) that specify metadata of a name (526) and a location (528). The template (520) further includes a row publication prototype (529) that includes a script for publishing a row of a database. The script includes placeholders for the name (526) and the location (528).

At a second point in time, illustrated in FIG. 5B, the data processing device (500) has generated a sales distribution manifest (530) that includes a sales database filename (532) and a sales database storage location (534) in accordance with the placeholders for the name (526, FIG. 5A) and the location (528, FIG. 5A).

Following the second point in time, a client requests that a row publication be performed on the sales database (510). FIG. 5C shows a diagram illustrating the actions taken by the data processing device (500) to service the aforementioned request.

Starting on the left hand side of FIG. 5C, the data processing device (not shown) obtains the row publication prototype (529) from the template (520, FIG. 5B), the sales database file name (532) from the sales distribution manifest (530), and the sales database storage location (534) from the sales distribution manifest (530). The data processing device replaces placeholders in the row publication prototype (529) with the sales database file name (532) and sales database storage location (534) to generate a script. The script may be executable code (540)

Using the executable code (540), the data processing device (not shown) operates on the sales database (510) to extract a row and publish the row with a name of the sale database filename (532) and at the location specified by the sales database storage location (534) to associate the published row with the database The example ends following the publication of the row.

Embodiments of the invention may improve the performance of computations in a network environment by enabling the same computation to be performed on different types/formats of data. By utilizing templates to dynamically generate executable entities, one or more embodiments of the invention may provide a computing device that may processes any type/format of data Additional embodiments of the invention address the problem of computation performance in a networked environment. By generating executable entities that perform computation on a particular type/format of data, a computing device does not need to have native compatibility with the type/format of data.

Still further embodiments of the invention may reduce a cognitive burden on a user of a computing device. When a computing device does not include native compatibility with a type/format of data, traditionally the user is required to either reformat the data into a format that is natively supported. A computing device that includes many different types/formats of data may place a heavy cognitive burden on a user. Embodiments of the invention may reduce the cognitive burden on a user by enabling computations to be performed on data for which native support is not available.

Computing devices in accordance with embodiments of the invention may also provide users with a much larger degree of flexibility when implementing computations when compared to traditional systems. By providing users with access to the templates in the template library, a user may be able to modify computation prototypes/metadata definitions to meet functionality requirements set by the user. For example, a user may modify a computation prototype to add time stamps, associate with computation results with assets from which the computation result was generated, or any other function not provided by tradition computing devices/environments.

While the above discussion highlighted features and/or uses of the invention, embodiments of the invention are not limited to similar uses and are not required to include similar features without departing from the invention. For example, some embodiments of the invention may have different, fewer, or more uses without departing from the invention.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of operating a computing device, comprising:
    obtaining a computation request for an asset comprising a computation type;
    instantiating an executable entity based on a matched computation prototype and a manifest associated with the asset;
    performing, to obtain a computation result, the computation request using:
        the instantiated executable entity,
        and metadata specified by the manifest associated with the asset; and
    providing the obtained computation result,
    wherein before obtaining the computation request:
        matching an asset type of the asset to a template of a template library based on an asset type specified by the template, wherein the template comprises the asset type, the matched computational prototype, and metadata definitions; and
        instantiating the manifest based on the matched template, wherein the manifest comprises an identifier of the asset, metadata associated with the asset based on the metadata definitions of the template, an identifier of the matched template, and the matched computation prototype of a computation type specified by the computation request,
    wherein instantiating the executable entity based on the matched computation prototype and the manifest associated with the asset comprises:
    matching the computation type of the request to the matched computation prototype;
        modify the matched computation prototype using metadata of the manifest associated with the asset; and
        generate the executable entity using the modified matched computation prototype, and
    wherein modifying the matched computation prototype using the metadata of the manifest associated with the asset comprises:
    identifying a placeholder of the matched computation prototype;
        matching the identified placeholder to an element of the metadata of the manifest associated with the asset; and
        replacing the placeholder with the matched element of the metadata of the manifest associated with the asset.

2. The method of claim 1, wherein generating the executable entity using the modified matched computation prototype comprises:
    compiling machine code executable by the processor based on the modified matched computation prototype.

3. The method of claim 1, wherein performing the computation request using the instantiated executable entity and metadata specified by the manifest associated with the asset to obtain a computation result comprises:
    compiling the executable entity to obtain machine code; and
    executing the machine code.

4. The method of claim 1, wherein executable entity comprises a high-level language script.

5. The method of claim 1, wherein the machine code executes using meta data of the manifest associated with the asset.

6. The method of claim 1, wherein instantiating the manifest based on the matched template comprises:
identifying the metadata definition specified by the matched template; and
generating the metadata of the manifest based on the metadata definition.

7. A computing device, comprising:
a persistent storage comprising an asset; and
a processor programmed to:
obtain a computation request for the asset comprising a computation type;
instantiate an executable entity based on a matched computation prototype and a manifest associated with the asset;
perform the computation request using the instantiated executable entity and metadata specified by the manifest associated with the asset to obtain a computation result; and
providing the obtained computation result,
wherein before obtaining the computation request, the processor:
matches an asset type of the asset to a template of a template library based on an asset type specified by the template, wherein the template comprises the asset type, the matched computational prototype, and metadata definitions; and
instantiate the manifest based on the matched template, wherein the manifest comprises an identifier of the asset, metadata associated with the asset based on the metadata definitions of the template, an identifier of the matched template, and the matched computation prototype of a computation type specified by the computation request,
wherein instantiating the executable entity based on the matched computation prototype and the manifest associated with the asset comprises:
matching the computation type of the request to the matched computation prototype;
modify the matched computation prototype using metadata of the manifest associated with the asset; and
generate the executable entity using the modified matched computation prototype, and
wherein modifying the matched computation prototype using the metadata of the manifest associated with the asset comprises:
identifying a placeholder of the matched computation prototype;
matching the identified placeholder to an element of the metadata of the manifest associated with the asset; and
replacing the placeholder with the matched element of the metadata of the manifest associated with the asset.

8. The computing device of claim 1, wherein generating the executable entity using the modified matched computation prototype comprises:
compiling machine code executable by the processor based on the modified matched computation prototype.

9. The computing device of claim 1, wherein performing the computation request using the instantiated executable entity and metadata specified by the manifest associated with the asset to obtain a computation result comprises:
compiling the executable entity to obtain machine code; and
executing the machine code.

10. The computing device of claim 9, wherein executable entity comprises a high-level language script.

11. The computing device of claim 9, wherein the machine code executes using meta data of the manifest associated with the asset.

12. The computing device of claim 1, wherein instantiating the manifest based on the matched template comprises:
identifying the metadata definition specified by the matched template; and
generating the metadata of the manifest based on the metadata definition.

13. The computing device of claim 1, wherein the computing device is a computer cluster.

14. The computing device of claim 1, wherein the computing device is a cloud computing system.

15. A non-transitory computer readable medium comprising computer readable program code, which when executed by a computer processor enables the computer processor to perform a method for operating a computing device, the method comprising:
obtaining a computation request for an asset comprising a computation type;
instantiating an executable entity based on a matched computation prototype and a manifest associated with the asset;
performing, to obtain a computation result, the computation request using:
the instantiated executable entity,
and metadata specified by the manifest associated with the asset; and
providing the obtained computation result,
wherein before obtaining the computation request:
matching an asset type of the asset to a template of a template library based on an asset type specified by the template, wherein the template comprises the asset type, the matched computational prototype, and metadata definitions; and
instantiating the manifest based on the matched template, wherein the manifest comprises an identifier of the asset, metadata associated with the asset based on the metadata definitions of the template, an identifier of the matched template, and the matched computation prototype of a computation type specified by the computation request,
wherein instantiating the executable entity based on the matched computation prototype and the manifest associated with the asset comprises:
matching the computation type of the request to the matched computation prototype;
modify the matched computation prototype using metadata of the manifest associated with the asset; and
generate the executable entity using the modified matched computation prototype, and
wherein modifying the matched computation prototype using the metadata of the manifest associated with the asset comprises:
identifying a placeholder of the matched computation prototype;
matching the identified placeholder to an element of the metadata of the manifest associated with the asset; and
replacing the placeholder with the matched element of the metadata of the manifest associated with the asset.

16. The non-transitory computer readable medium of claim 15, wherein generating the executable entity using the modified matched computation prototype comprises:

compiling machine code executable by the processor based on the modified matched computation prototype.

17. The non-transitory computer readable medium of claim 15, wherein performing the computation request using the instantiated executable entity and metadata specified by the manifest associated with the asset to obtain a computation result comprises:
   compiling the executable entity to obtain machine code; and
   executing the machine code.

18. The non-transitory computer readable medium of claim 15, wherein executable entity comprises a high-level language script.

19. The non-transitory computer readable medium of claim 15, wherein the machine code executes using meta data of the manifest associated with the asset.

20. The non-transitory computer readable medium of claim 15, wherein instantiating the manifest based on the matched template comprises:
   identifying the metadata definition specified by the matched template; and
   generating the metadata of the manifest based on the metadata definition.

\* \* \* \* \*

UNITED STATES PATENT AND TRADEMARK OFFICE
CERTIFICATE OF CORRECTION

PATENT NO. : 10,977,016 B2
APPLICATION NO. : 15/764861
DATED : April 13, 2021
INVENTOR(S) : Wenbin Lu et al.

Page 1 of 1

It is certified that error appears in the above-identified patent and that said Letters Patent is hereby corrected as shown below:

In the Claims

Column 14, Line 36 in Claim 1, the phrase "modify the matched" should read -- modifying the matched --.

Column 14, Line 38 in Claim 1, the phrase "generate the executable entity" should read -- generating the executable entity --.

Column 15, Line 56 in Claim 8, the phrase "of claim 1" should read -- of claim 7 --.

Column 15, Line 61 in Claim 9, the phrase "of claim 1" should read -- of claim 7 --.

Column 16, Line 6 in Claim 12, the phrase "of claim 1" should read -- of claim 7 --.

Column 16, Line 12 in Claim 13, the phrase "of claim 1" should read -- of claim 7 --.

Column 16, Line 14 in Claim 14, the phrase "of claim 1" should read -- of claim 7 --.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*